US012159753B2

(12) United States Patent
Park et al.

(10) Patent No.: US 12,159,753 B2
(45) Date of Patent: Dec. 3, 2024

(54) BI-STABLE SOFT ELECTROMAGNETIC ACTUATOR

(71) Applicant: Seoul National University R&DB Foundation, Seoul (KR)

(72) Inventors: Yong Lae Park, Seoul (KR); Gyo Wook Shin, Seoul (KR); Yeongjin Choi, Seoul (KR); Byung Jun Jeon, Seoul (KR); Inrak Choi, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 55 days.

(21) Appl. No.: 17/896,987

(22) Filed: Aug. 26, 2022

(65) Prior Publication Data

US 2023/0069562 A1 Mar. 2, 2023

(30) Foreign Application Priority Data

Aug. 27, 2021 (KR) ........................ 10-2021-0113744

(51) Int. Cl.
*H01F 7/122* (2006.01)
*H01F 7/08* (2006.01)
*H01F 7/16* (2006.01)

(52) U.S. Cl.
CPC ............. *H01F 7/122* (2013.01); *H01F 7/081* (2013.01); *H01F 7/1646* (2013.01); *H01F 2007/086* (2013.01); *H01F 2007/1669* (2013.01)

(58) Field of Classification Search
CPC ........ H01F 7/122; H01F 7/081; H01F 7/1646; H01F 2007/086; H01F 2007/1669
USPC ........................................................... 335/234
See application file for complete search history.

(56) References Cited

U.S. PATENT DOCUMENTS 6,115,636 A * 9/2000 Ryan .................. A61N 1/37229 128/903
6,303,885 B1 10/2001 Hichwa et al.
6,337,612 B1 * 1/2002 Kim .................. H01H 51/2209 335/229
(Continued)

FOREIGN PATENT DOCUMENTS

CN 205380680 7/2016
CN 110576447 12/2019
(Continued)

OTHER PUBLICATIONS

Do, Thanh Nho, et al. "Miniature soft electromagnetic actuators for robotic applications." Advanced Functional Materials, vol. 28, No. 18, (2018), pp. 1-11.
(Continued)

*Primary Examiner* — Shawki S Ismail
*Assistant Examiner* — Lisa N Homza
(74) *Attorney, Agent, or Firm* — CANTOR COLBURN LLP

(57) ABSTRACT

A bi-stable soft electromagnetic actuator includes a housing including a frame portion formed of a stretchable elastic body, a stretchable coil portion generating an electromagnetic field by applied power, located in the housing, and having a first surface and a second surface facing in mutually opposite directions, and at least a pair of permanent magnet portions respectively facing the first surface and the second surface of the stretchable coil portion and arranged to maintain a distance by the frame portion.

20 Claims, 14 Drawing Sheets

(56) References Cited

U.S. PATENT DOCUMENTS

| | | | | |
|---|---|---|---|---|
| 7,411,331 | B2 | 8/2008 | Dubowsky et al. | |
| 7,518,269 | B2 * | 4/2009 | Lee | H01H 33/6662 335/200 |
| 9,220,298 | B1 * | 12/2015 | En'Wezoh | A24D 1/18 |
| 10,181,373 | B2 | 1/2019 | Mecklenburg | |
| 10,297,376 | B2 * | 5/2019 | Church | H01F 7/1615 |
| 11,735,344 | B2 * | 8/2023 | Kim | H02K 11/0141 335/229 |
| 2006/0208591 | A1 * | 9/2006 | Lee | H01H 51/2209 310/120 |
| 2011/0148553 | A1 * | 6/2011 | Pantke | H01F 7/17 335/215 |
| 2013/0098318 | A1 * | 4/2013 | Nendel | H01F 7/1646 123/90.11 |
| 2013/0169395 | A1 * | 7/2013 | Ihara | H02K 15/03 335/302 |
| 2013/0190552 | A1 * | 7/2013 | Leblans | H04R 25/606 600/25 |
| 2015/0369264 | A1 | 12/2015 | Felt et al. | |
| 2019/0096557 | A1 * | 3/2019 | Church | H01F 7/1646 |

FOREIGN PATENT DOCUMENTS

| | | | |
|---|---|---|---|
| CN | 112318488 | | 2/2021 |
| EP | 2561523 | | 11/2015 |
| KR | 100926186 | B1 | 11/2009 |
| KR | 1020160128045 | A | 11/2016 |
| KR | 1020160135445 | A | 11/2016 |

OTHER PUBLICATIONS

Kohls, Noah, et al. "Compliant Electromagnetic Actuator Architecture for Soft Robotics." 2020 IEEE International Conference on Robotics and Automation (ICRA), (2020), pp. 9042-9049.

Nemitz, Markus P., et al. "Using voice coils to actuate modular soft robots: wormbot, an example.", Soft Robotics, vol. 3, No. 4, (2016), pp. 198-204.

Paknahad, Ali Asghar, et al., "An electromagnetic micro-actuator with PDMS-Fe3O4 nanocomposite magnetic membrane.", Microelectronic Engineering, vol. 216, (2019), pp. 1-9.

* cited by examiner

BI-STABLE SOFT ELECTROMAGNETIC ACTUATOR

CROSS-REFERENCE TO RELATED APPLICATION

This application claims priority to and the benefit of Korean Patent Application No. 10-2021-0113744 filed in the Korean Intellectual Property Office on Aug. 27, 2021, the entire contents of which are incorporated herein by reference.

BACKGROUND OF THE INVENTION

(a) Field of the Invention

The present disclosure relates to an electromagnetic actuator.

(b) Description of the Related Art

An actuator is an element that gives a physical motion to an object based on a control signal output from a controller. Electromagnetic actuators expose a free-moving plunger or armature to a magnetic field generated by supplying power to static wire coils to provide movement used for actuation.

Existing electromagnetic actuators generate linear reciprocating motion through the interaction of a wire coil coupled to a rigid housing and a permanent magnet, and a structure that provides a restoring force using a coil spring or a leaf spring is known.

However, as research on wearable devices has been actively conducted, considering the recent development environment that requires miniaturization and adaptability to the human body, there is a limit to the application of hard and rigid actuators, and thus the development of a soft actuator is required.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide soft electromagnetic actuator having advantages of providing a bi-directional driving force through a bi-stable mechanism by supporting a metal coil and a permanent magnet with a soft and elastic structure.

However, the problems to be solved by the exemplary embodiments of the present invention are not limited to the aforementioned problems and may be variously expanded within the scope of the technical idea included in the present invention.

An exemplary embodiment of the present invention provides a bi-stable soft electromagnetic actuator including: a housing including a frame portion formed of a stretchable elastic body, a stretchable coil portion generating an electromagnetic field by applied power, located in the housing, and having a first surface and a second surface facing in mutually opposite directions, and at least a pair of permanent magnet portions respectively facing the first surface and the second surface of the stretchable coil portion and arranged to maintain a distance by the frame portion.

The housing may include a coil portion cover, and the stretchable coil portion may be configured to include a pair of stretchable coils sharing a central axis and connected to each other in a facing manner in the coil portion cover.

The housing may include a magnet portion cover located to face each of the first surface and the second surface of the stretchable coil portion, and at least the pair of permanent magnet portions may each be configured to include a permanent magnet in the magnet portion cover.

The frame portion may include a plurality of frames spaced apart from each other along a circumference of the stretchable coil portion.

The housing may include a silicone elastomer material.

The at least one pair of permanent magnet portions may include a first permanent magnet portion and a second permanent magnet portion arranged to face each other with the stretchable coil portion interposed therebetween, and the first permanent magnet portion and the second permanent magnet portion may be arranged so that different polarities face each other so that attractions act therebetween.

The housing may include a first frame portion including a plurality of frames connecting the first permanent magnet portion and the stretchable coil portion to each other; and a second frame portion including a plurality of frames connecting the second permanent magnet portion and the stretchable coil portion to each other.

The housing may include a first magnet portion cover constituting the first permanent magnet portion, a second magnet portion cover constituting the second permanent magnet portion, and a coil portion cover constituting the stretchable coil portion, the first frame portion is configured to connect the first magnet portion cover and the coil portion cover to each other, and the second frame portion is configured to connect the second magnet portion cover and the coil portion cover to each other.

The bi-stable soft electromagnetic actuator may have a first region in which an attraction acting between the first permanent magnet portion and the second permanent magnet portion is greater than an elastic force of the frame portion at a point closer to the stretchable coil portion than the first permanent magnet portion or the second permanent magnet portion based on a distance between the first permanent magnet portion or the second permanent magnet portion and the stretchable coil portion. The bi-stable soft electromagnetic actuator may have a second region in which an elastic force of the frame portion is greater than an attraction acting between the first permanent magnet portion and the second permanent magnet portion at a point closer to the first permanent magnet portion or the second permanent magnet portion than the stretchable coil portion based on the distance between the first permanent magnet portion or the second permanent magnet portion and the stretchable coil portion.

The at least one pair of permanent magnet portions may include a third permanent magnet and a fourth permanent magnet arranged to face each other with the stretchable coil interposed therebetween, and the third permanent magnet portion and the fourth permanent magnet portion may be arranged so that the same polarities face each other so that a repulsion acts therebetween.

The housing may include a third frame portion including a plurality of frames connecting the third permanent magnet portion and the stretchable coil portion to each other; and a fourth frame portion including a plurality of frames connecting the fourth permanent magnet portion and the stretchable coil portion to each other.

The housing may include a third magnet portion cover constituting the third permanent magnet portion, a fourth magnet portion cover constituting the fourth permanent magnet portion, and a coil portion cover constituting the stretchable coil portion, the third frame portion may be configured to connect the third magnet portion cover and the coil portion cover to each other, and the fourth frame portion may be configured to connect the fourth magnet portion cover and the coil portion cover to each other.

A first ferromagnetic layer and a second ferromagnetic layer may be formed to be adjacent to each of the first and second surfaces of the stretchable coil portion.

The bi-stable soft electromagnetic actuator may have a third region in which an attraction acting between the third permanent magnet portion and the first ferromagnetic layer or between the fourth permanent magnet portion and the second ferromagnetic layer is greater than a resultant force of a repulsion between the third permanent magnet portion and the fourth permanent magnet portion and an elastic force of the frame portion at a point closer to the stretchable coil portion than the third permanent magnet portion or the fourth permanent magnet portion based on a distance between the third permanent magnet portion or the fourth permanent magnet portion and the stretchable coil portion. The bi-stable soft electromagnetic actuator may have a fourth region in which a resultant force of the repulsion between the third permanent magnet portion and the fourth permanent magnet portion and the elastic force of the frame portion is greater than the attraction acting between the third permanent magnet portion and the first ferromagnetic layer or between the fourth permanent magnet portion and the second ferromagnetic layer at a point closer to the third permanent magnet portion or the fourth permanent magnet portion than the stretchable coil portion based on the distance between the third permanent magnet portion or the fourth permanent magnet portion and the stretchable coil portion.

Another exemplary embodiment of the present invention provides a bi-stable soft electromagnetic actuator assembly including a plurality of unit actuators attached to each other by magnetic force. Each of the unit actuators may include a housing including a frame portion formed of a stretchable elastic body, a stretchable coil portion generating an electromagnetic field by applied power, located in the housing, and having a first surface and a second surface facing in mutually opposite directions, and at least a pair of permanent magnet portions respectively facing the first surface and the second surface of the stretchable coil portion and arranged to maintain a distance by the frame portion.

The at least one pair of permanent magnet portions may include a first permanent magnet portion and a second permanent magnet portion arranged to face each other with the stretchable coil portion interposed therebetween, and the first permanent magnet portion and the second permanent magnet portion may be arranged so that different polarities face each other so that an attraction acts therebetween.

The plurality of unit actuators may be configured such that the first permanent magnet portion and the second permanent magnet portion of different unit actuators are attached to each other and coupled to each other.

The housing may include a first frame portion including a plurality of frames connecting the first permanent magnet portion and the stretchable coil portion to each other; and a second frame portion including a plurality of frames connecting the second permanent magnet portion and the stretchable coil portion to each other.

The unit actuator may have a first region in which an attraction acting between the first permanent magnet portion and the second permanent magnet portion is greater than an elastic force of the frame portion at a point closer to the stretchable coil portion than the first permanent magnet portion or the second permanent magnet portion based on a distance between the first permanent magnet portion or the second permanent magnet portion and the stretchable coil portion. The unit actuator may have a second region in which an elastic force of the frame portion is greater than an attraction acting between the first permanent magnet portion and the second permanent magnet portion at a point closer to the first permanent magnet portion or the second permanent magnet portion than the stretchable coil portion based on the distance between the first permanent magnet portion or the second permanent magnet portion and the stretchable coil portion.

The housing may include a silicone elastomer material.

According to the soft electromagnetic actuator of the exemplary embodiment, the components of the actuator are formed of a soft material, so that the actuator may be flexibly contracted or restored through electromagnetic force.

In addition, since the soft electromagnetic actuator is designed to have a bi-stable structure using the relationship between magnetic force and elastic force, the soft electromagnetic actuator is efficient in terms of energy and may be easily modularized, so that force and contraction displacement of the actuator may be varied.

In addition, as an actuator with a built-in sensor, it is possible to measure a deformation state, and since a plurality of actuators may be connected to have various structures by using a ferromagnetic material, the actuator may be variously utilized.

In addition, the configuration may be expanded by modularizing individual soft electromagnetic actuators as unit actuators and combining a plurality of unit actuators using permanent magnet portions at both ends.

In addition, it is possible to measure a deformation state of the actuator by measuring an inductance value of a coil of the stretchable coil portion.

DETAILED DESCRIPTION OF THE EXEMPLARY EMBODIMENTS

Figure 1:
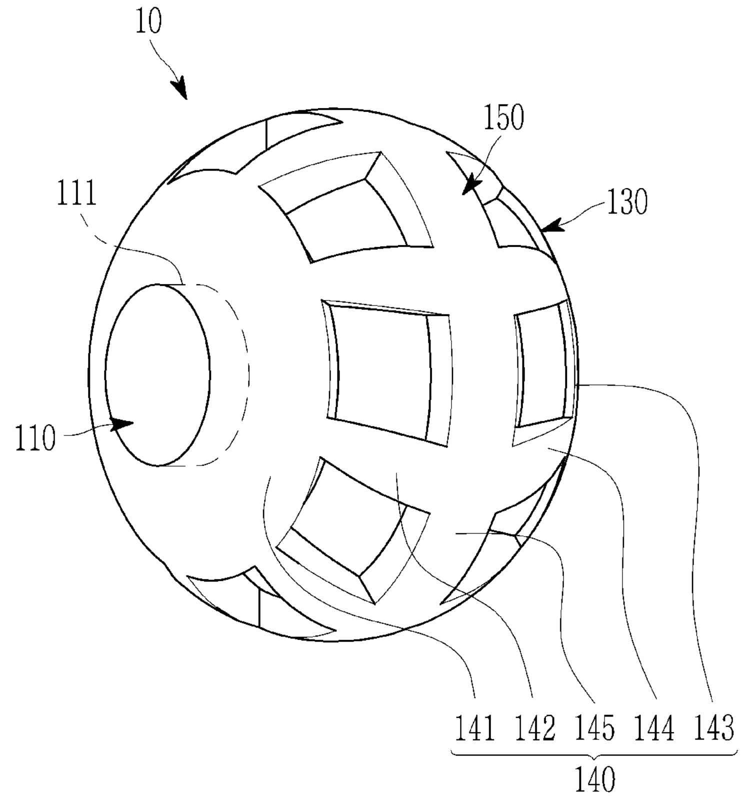
FIG. 1 is a perspective view illustrating a soft electromagnetic actuator according to an exemplary embodiment.

Hereinafter, exemplary embodiments of the present invention will be described in detail with reference to the accompanying drawings to allow those skilled in the art to practice the present invention. Portions unrelated to the description may be omitted in order to more clearly describe the present invention, and the same or similar components may be denoted by the same reference numerals throughout the present specification. In the accompanying drawings, some of the elements in the accompanying drawings are exaggerated, omitted, or schematically illustrated, and the size of each element does not entirely reflect the actual size.

The accompanying drawings of the present invention aim to facilitate understanding of the present invention and should not be construed as limited to the accompanying drawings. Also, the present invention is not limited to a specific disclosed form but includes all modifications, equivalents, and substitutions without departing from the scope and spirit of the present invention.

Terms including ordinals, such as first, second, etc., may be used to describe various elements but such elements are not limited to the above terms. The above terms are used only for the purpose of distinguishing one component from another.

Further, it will be understood that when an element such as a layer, film, region, or substrate is referred to as being "above" or "on" another element, it may be "directly above" the other element, or intervening elements may also be present. In contrast, when an element is referred to as being "directly on" another element, there are no intervening elements present. Further, when an element is "above" or "on" the reference portion, it may mean that the element is positioned above or below the reference portion, and it may not necessarily mean that the element is "above" or "on" toward an opposite direction of gravity.

Throughout the specification, the terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded. Therefore, unless explicitly described to the contrary, the word "comprise", and variations such as "comprises" or "comprising", will be understood to imply the inclusion of stated elements but not the exclusion of any other elements.

Throughout the specification, when it is referred to "in plan view", it means that a target element is viewed from above, and when it is referred to "in cross-sectional view", it means that a target element taken vertically is viewed from the side.

In addition, throughout the specification, when "connected", it may not only mean that two or more components are directly connected, but also that two or more components are indirectly connected through other components, physically connected, and electrically connected, or integrated although they are designated by different names depending on position or function.

Figure 2:
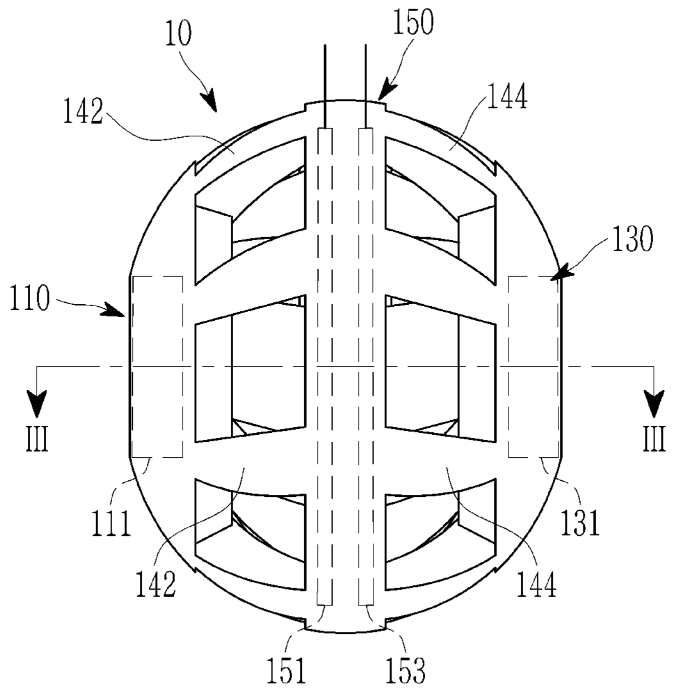
FIG. 2 is a front view of the soft electromagnetic actuator shown in FIG. 1.
Figure 3:
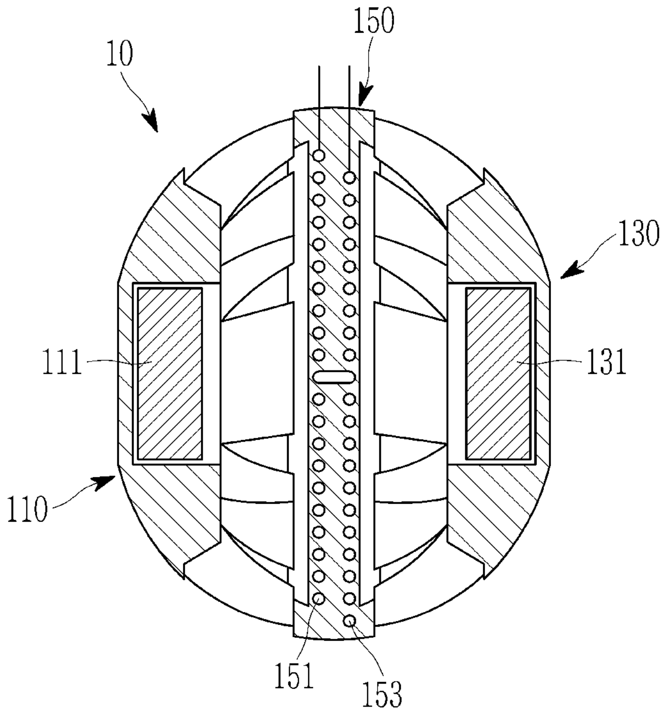
FIG. 3 is a cross-sectional view taken along line III-III of FIG. 2.

FIG. 1 is a perspective view illustrating a soft electromagnetic actuator according to an exemplary embodiment, FIG. 2 is a front view of the soft electromagnetic actuator shown in FIG. 1, and FIG. 3 is a cross-sectional view taken along line III-III of FIG. 2.

Referring to FIG. 1, a soft electromagnetic actuator 10 according to the present exemplary embodiment includes a housing 140, a stretchable coil portion 150 disposed at the center of the housing 140, and a first permanent magnet portion 110 and a second permanent magnet portion 130 located on both sides of the stretchable coil portion 150, while maintaining a distance therebetween. The stretchable coil portion 150 generates an electromagnetic field as power is applied thereto and may form magnetic poles on both sides.

The housing 140 includes frame portions 142 and 143 formed of a stretchable elastic body, surrounds the stretchable coil portion 150 and the first and second permanent magnet portions 110 and 130, and may function to set positions of each component. The stretchable coil portion 150 has a first surface and a second surface facing in mutually opposite directions, the first permanent magnet portion 110 is located to face the first surface of the stretchable coil portion 150 and the second permanent magnet portion 130 may be located to face the second surface of the stretchable coil portion 150.

The first permanent magnet portion 110 may be connected, while maintaining an interval from the stretchable coil portion 150 by the first frame portion 142, and the second permanent magnet portion 130 may be connected, while maintaining an interval from the stretchable coil portion 150 by the second frame portion 144. The first frame portion 142 may include a plurality of frames, and the plurality of frames may be spaced apart from each other along the circumference of the stretchable coil portion 150 and connected to the first permanent magnet portion 110. In addition, the second frame portion 144 may also include a plurality of frames, the plurality of frames may be spaced apart from each other along the circumference of the stretchable coil portion 150 and connected to the second permanent magnet portion 130.

Figure 4:
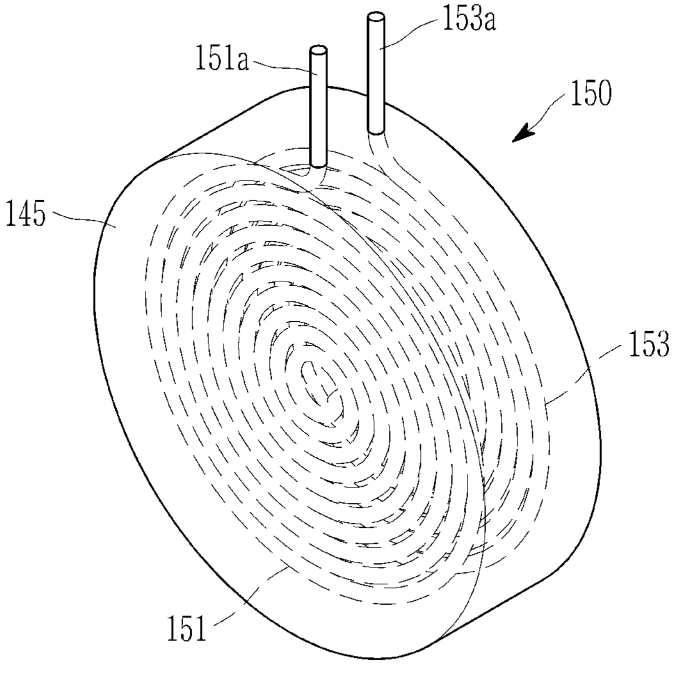
FIG. 4 is a perspective view illustrating a stretchable coil portion of the soft electromagnetic actuator shown in FIG. 1.

FIG. 4 is a perspective view illustrating a stretchable coil portion of the soft electromagnetic actuator shown in FIG. 1.

Referring to FIG. 4, the stretchable coil portion 150 may include a pair of stretchable coils 151 and 153 connected to each other. The pair of stretchable coils 151 and 153 share a central axis and may be disposed to face each other. The stretchable coil portion 150 may include the pair of stretchable coils 151 and 153 in a disc-shaped coil portion cover 145. The coil portion cover 145 may form a portion of the housing 140.

The coil portion cover 145 may be formed of, for example, a silicone elastomer material, and as another example, the coil portion cover 145 may include a material that is easily deformable and may generate elastic force, such as resin, rubber, or film. The pair of stretchable coils 151 and 153 may be manufactured by printing liquid metal. The liquid metal may be formed of a conductive material having high conductivity, and for example, may be formed of a gallium alloy including eutectic gallium-indium (EGaIn). The pair of stretchable coils 151 and 153 may include at least two terminal wires **151*a* and 153*a* in order to apply power, and positive (+) or negative (−) electrode power may be selectively applied to the terminal wires 151*a*** and 153*a*. A direction of a current may be changed as the positive electrode power and the negative electrode power are interchangeably applied to the terminal wires 151*a* and 153*a*, and accordingly, the magnetic poles of both sides of the stretchable coil portion 150 may also be changed.

Referring back to FIGS. 1 to 3, the first permanent magnet portion 110 and the second permanent magnet portion 130 may include permanent magnets having a coil shape, that is, having a flat cylindrical shape with a height smaller than a diameter, in the dome-shaped magnet portion covers 141 and 143. The magnet portion covers 141 and 143 may form a portion of the housing 140. The magnet portion cover 141 of the first permanent magnet portion 110 may be connected to the coil portion cover 145 by a plurality of frames of the first frame portion 142, and the magnetic portion cover 143 of the second permanent magnet portion 130 may be connected to the coil portion cover 145 by a plurality of frames of the second frame portion 144.

The first permanent magnet portion 110 and the second permanent magnet portion 130 may be disposed to face each other with the stretchable coil portion 150 interposed therebetween. In this case, the first permanent magnet portion 110 and the second permanent magnet portion 130 may be arranged so that larger surfaces thereof face the stretchable coil portion 150. Therefore, the stretchable coil portion 150 and the first and second permanent magnet portions 110 and 130 may be arranged and configured to share a central axis with each other.

In the present exemplary embodiment, the first permanent magnet portion 110 and the second permanent magnet portion 130 may be arranged so that different magnetic poles face each other. That is, in the first permanent magnet portion 110, when the S pole faces a first surface of the stretchable coil portion 150 and the N pole is located on the opposite side, in the second permanent magnet portion 130, the N pole may face the second surface of the stretchable coil portion 150 and the S pole may be located on the opposite side. In addition, in the first permanent magnet portion 110, when the N pole faces the first surface of the stretchable coil portion 150 and the S pole is located on the opposite side, in the second permanent magnet portion 130, the S pole may face the second surface of the stretchable coil portion 150 and the N pole may be located on the opposite side.

Meanwhile, the soft electromagnetic actuator 10 according to the present exemplary embodiment may have a first region in which an attraction acting between the first permanent magnet portion 110 and the second permanent magnet portion 130 is greater than an elastic force of the frame portions 142 and 144 at a point closer to the stretchable coil portion 150 based on a distance in an expanded state between the first permanent magnet portion 110 or the second permanent magnet portion 130 and the stretchable coil portion 150. In addition, the soft electromagnetic actuator 10 according to the present exemplary embodiment may have a second region in which the elastic force of the frame portions 142 and 144 is greater than the attraction acting between the first permanent magnet portion 110 and the second permanent magnet portion 130 at a point closer to the first permanent magnet portion 110 or the second permanent magnet portion 130 than the stretchable coil portion 150 based on a distance between the first permanent magnet portion 110 or the second permanent magnet portion 130 and the stretchable coil portion 150.

Therefore, when the soft electromagnetic actuator 10 in the expanded state is contracted by applying a current, the distance between the first permanent magnet portion 110 and the second permanent magnet portion 130 decreases and the attraction between each other increases to be greater than the elastic force of the frame portion 142 and 144. Accordingly, even if power is applied to and then removed from the stretchable coil portion 150, the first permanent magnet portion 110 and the second permanent magnet portion 130 may be attached as it is and maintained in a contracted state, rather than being returned to the original position, by the elastic force of the frame portions 142 and 144, thereby exhibiting bi-stability.

Figure 5:
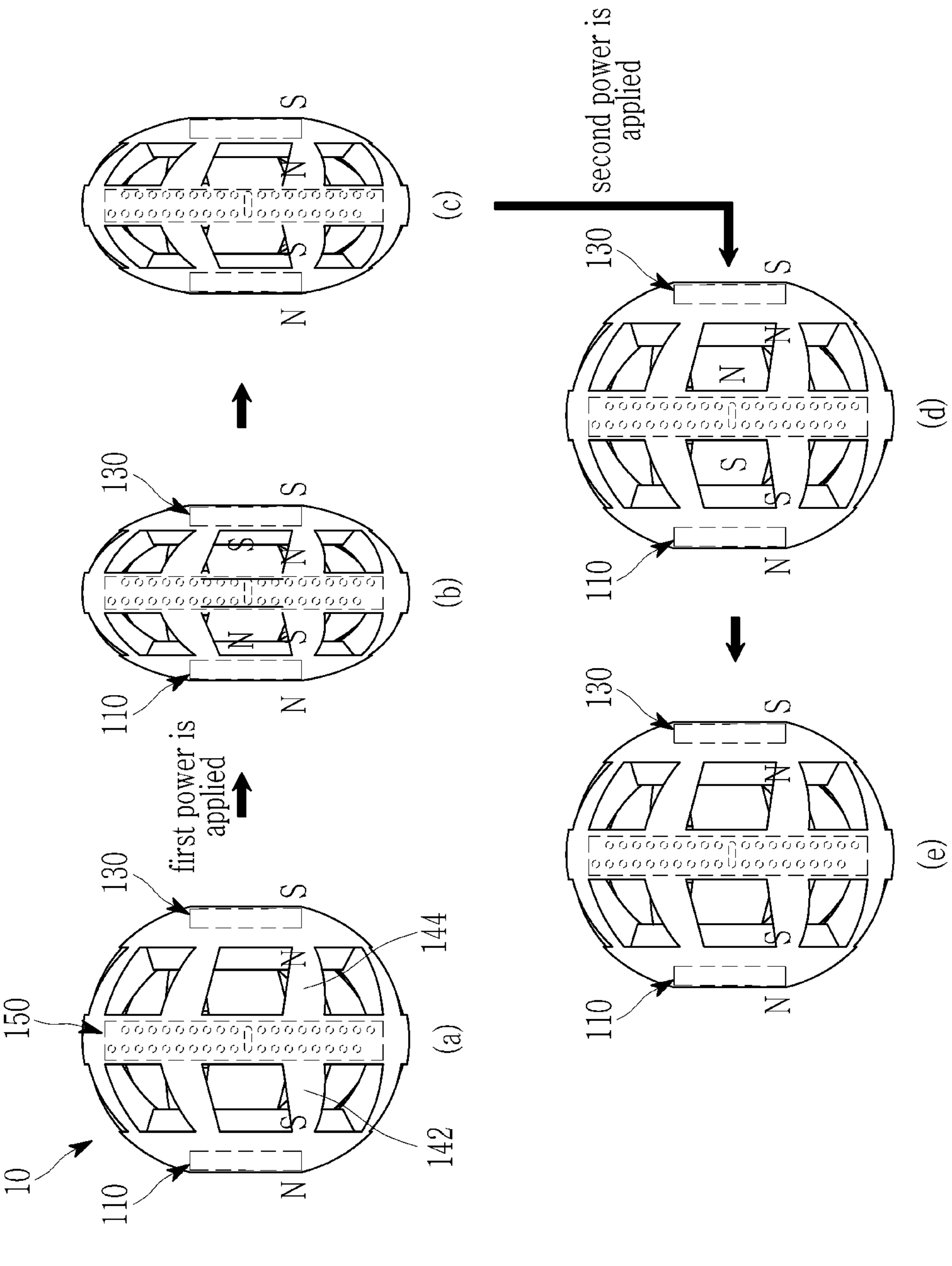
FIG. 5 is a diagram illustrating a state of an actuator driven by applying a current to the soft electromagnetic actuator shown in FIG. 1.

FIG. 5 is a diagram illustrating a state of an actuator driven by applying a current to the soft electromagnetic actuator shown in FIG. 1.

Referring to FIG. 5, in the soft electromagnetic actuator 10 according to the present exemplary embodiment, a maximum distance is maintained between the stretchable coil portion 150 and the first and second permanent magnet portions 130 at an early stage. The maximum distance may be determined by an initially (before deformation) set length of the frame portions 142 and 144 of the housing 140, and an initial distance between the first permanent magnet portion 110 and the stretchable coil portion 150 may be set by the first frame portion 142, and an initial distance between the second permanent magnet portion 130 and the stretchable coil portion 150 may be set by the second frame portion 144. Since the first frame portion 142 and the second frame portion 144 are formed of a silicone elastomer material, they have elasticity and may maintain their initial lengths (refer to (a) of FIG. 5).

Next, an electromagnetic field may be formed around the pair of stretchable coils 151 and 153 by applying a first power to the stretchable coil portion 150. Power may be applied through the terminal wires 151*a* and 153*a* (refer to FIG. 4) of the pair of stretchable coils 151 and 153, and positive (+) electrode and negative (−) electrode power may be selectively applied to the terminal wires 151*a* and 153*a*. In FIG. 5, illustration of the terminal wires 151*a* and 153*a* is omitted for simplicity of illustration.

By applying the first power to the stretchable coil portion 150, an attraction may act between the stretchable coil portion 150 and the first and second permanent magnet portions 110 and 130. A polarity opposite to a polarity of a side of the first permanent magnet portion 110 facing the stretchable coil portion 150 is generated on the first surface of the stretchable coil portion 150, and a polarity opposite to a polarity of a side of the second permanent magnet portion 130 facing the stretchable coil portion 150 may be generated on the second surface of the stretchable coil portion 150. For example, the polarities of the electrodes may be set such that a magnetic pol arrangement of the stretchable coil portion 150 is N-S when a magnetic pole arrangement of the first permanent magnet portion 110 and the second permanent magnet portion 130 is N-S, and the first power may be applied. In this manner, the stretchable coil portion 150 and the first and second permanent magnet portions 110 and 130, between which the attraction acts, may be attached to each other (refer to (b) of FIG. 5).

Next, when the power is removed from the stretchable coil portion 150, magnetism of the stretchable coil portion 150 disappears. However, since the surfaces of the first permanent magnet portion 110 and the second permanent magnet portion 130 having the opposite polarities face each other, attraction may act therebetween. Since the distance is closer than the initial state, attraction acts between the first permanent magnet portion 110 and the second permanent magnet portion 130, so even if the stretchable coil portion 150 loses its magnetism, the attached state may be maintained (refer to (c) of FIG. 5).

Next, by applying a second power to the stretchable coil portion 150, the stretchable coil portion 150 may be magnetized so that repulsion acts between the first and second permanent magnet portions 110 and 130. The second power may be set such that the polarities of the applied electrodes are opposite to those of the first power. A polarity that is the same as the polarity of the first permanent magnet portion 110 facing the stretchable coil portion 150 is generated in the first surface of the stretchable coil portion 150, and a polarity that is the same as a polarity of the second permanent magnet portion 130 facing the stretchable coil portion 150 may be generated in the second surface of the stretchable coil portion 150. For example, polarities of the electrodes may be set such that the magnetic pole arrangement of the stretchable coil portion 150 is S-N when the magnetic pole arrangement of the first permanent magnet portion 110 and the second permanent magnet portion 130 is N-S, and the second power may be applied. In this manner, the stretchable coil portion 150 and the first and second permanent magnet portions 110 and 130, between which repulsion acts, may be separated from each other (refer to (d) of FIG. 5).

Finally, when the power is removed from the stretchable coil portion 150, the magnetism of the stretchable coil portion 150 disappears. Since the sides of the first permanent magnet portion 110 and the second permanent magnet portion 130 having the mutually opposite polarities face each other, attraction may act therebetween. However, since the first permanent magnet portion 110 and the second permanent magnet portion 130 have returned to the distance of the initial state, the distance between the stretchable coil portion 150 and the first and second permanent magnet portions 110 and 130 may be maintained by the elastic force of the first frame portion 142 and the second frame portion 144. Therefore, even if the stretchable coil portion 150 loses its magnetism, it is possible to maintain the separation state (refer to (e) of FIG. 5).

Figure 6:
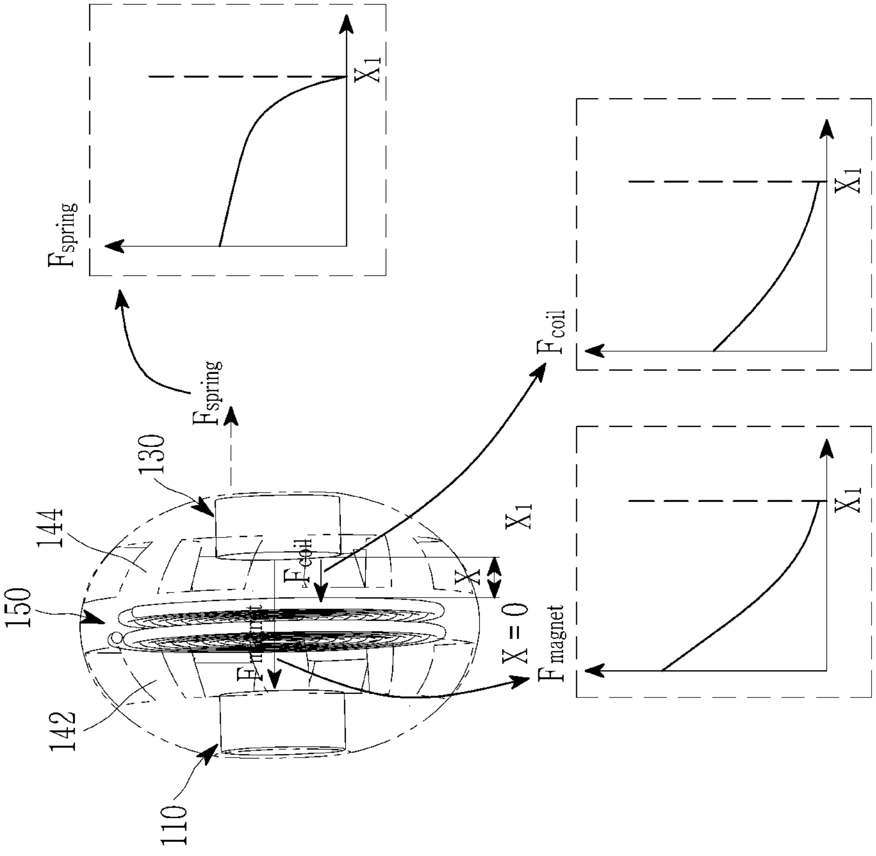
FIG. 6 is a diagram illustrating a bi-stable condition of the soft electromagnetic actuator shown in FIG. 1.
Figure 7:
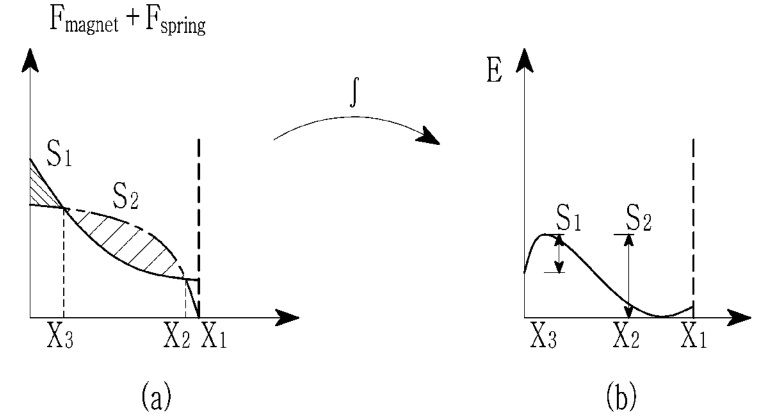
FIG. 7 is a graph illustrating a force relationship according to a distance between components of the soft electromagnetic actuator shown in FIG. 1.

FIG. 6 is a diagram illustrating a bi-stable condition of the soft electromagnetic actuator shown in FIG. 1, and FIG. 7 is a graph illustrating a force relationship according to a distance between components of the soft electromagnetic actuator shown in FIG. 1.

In the soft electromagnetic actuator 10 according to the present exemplary embodiment, electromagnetic force of the stretchable coil portion 150, magnetic force of the first and second permanent magnet portions 110 and 130, and elastic force of the first and second frame portions 142 and 144 may be designed to constitute a bi-stable condition.

Referring to FIG. 6, attraction between the stretchable coil portion 150 and the first permanent magnet portion 110 (or the second permanent magnet portion 130) may be defined as $F_{coil}$, attraction between the first permanent magnet portion 110 and the second permanent magnet portion may be defined as $F_{magnet}$, and elastic force of the first frame portion 142 (or the second frame portion 144) may be defined as $F_{spring}$. When a distance from the second frame portion 144 to the stretchable coil portion 150 is x, when power is applied to the stretchable coil portion 150 and attraction acts, $F_{coil}$, $F_{magnet}$, $F_{spring}$ increases in a direction toward the stretchable coil portion 150 from the second permanent magnet portions 130. That is, at $x=x_1$, $F_{coil}$ and $F_{magnet}$ have a minimum value, $F_{spring}$ is 0, and at x=0, $F_{coil}$, $F_{magnet}$, and $F_{spring}$ have a maximum value. Here, in a direction toward x=0, a change rate of force of $F_{coil}$ and $F_{magnet}$ gradually increases, and in a direction toward $x_1$, a change rate of force of $F_{spring}$ gradually decreases.

Referring to FIG. 7, when an attraction graph of $F_{magnet}$ and an elastic force graph of $F_{spring}$ are shown together, the attraction graph and the elastic force graph in the range between 0 and $x_1$ of x may form two intersection points at $x_2$ and $x_3$ (refer to (a) of FIG. 7). It can be seen that $F_{magnet}$ and $F_{spring}$ has an energy difference by the area ($S_1$ and $S_2$) appearing between the $F_{magnet}$ graph and the $F_{spring}$ graph, and when they are integrated to appear as a single energy (E) graph, a first inflection point convex upward at a point $x_3$ close to x=0 between the stretchable coil portion 150 and the second frame portion 144 (or the first frame portion 142) may be formed and a second inflection point convex downward at a point $x_2$ close to $x=x_1$ may be formed (refer to (b) of FIG. 7).

In (b) of FIG. 7, a low energy is a stable point, and a portion of x=0 in a contracted state and a portion of $x_2$ in an expanded state are stable points. A length of the second frame portion 144 between the stretchable coil portion 150 and the second permanent magnet portion 130 at the time of the initial design may be designed as $x_1$, and at this time, elastic force at $x_1$ is 0, but since there is attraction between the first permanent magnet portion 110 and the second permanent magnet portion 130, a stable point may be formed at $x_2$, which is slightly closer than $x_1$. When in the contracted state, between x=0 and $x_3$, attraction between the stretchable coil portion 150 and the second permanent magnet portion 130 (or the first permanent magnet portion 110) acts to be greater to maintain the attached state.

Accordingly, when power is applied to the stretchable coil portion 150 so that attraction acts, attraction greater than elastic force of the first frame portion 142 (or the second frame portion 144) may act on the stretchable coil portion 150 and the first and second permanent magnet portions 110 and 130, so that they may be attached to each other. Thereafter, even when the power is turned off, since the attraction between the first permanent magnet portion 110 and the second permanent magnet portion 130 is greater than the elastic force of the frame portions 142 and 144, the attached state may be maintained, thereby exhibiting the bi-stability.

Figure 8:
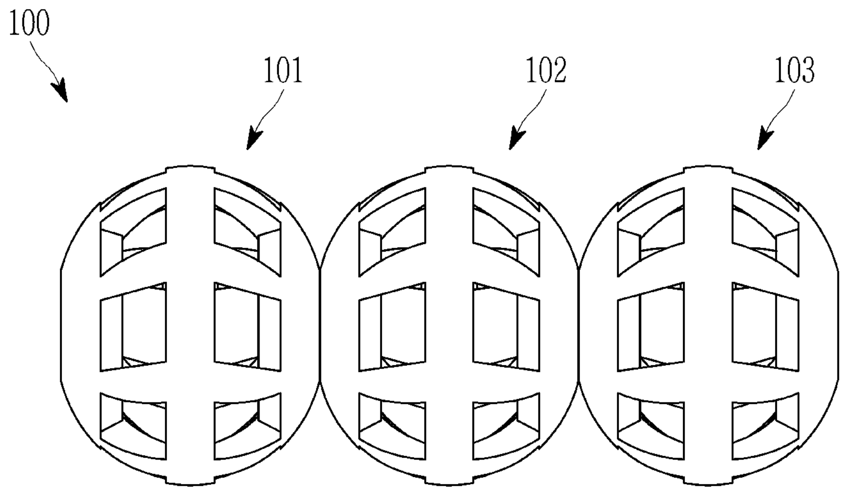
FIG. 8 is a front view illustrating a soft electromagnetic actuator assembly configured by combining a plurality of soft electromagnetic actuators shown in FIG. 1 as individual units.

FIG. 8 is a front view illustrating a soft electromagnetic actuator assembly configured by combining a plurality of soft electromagnetic actuators shown in FIG. 1 as individual units.

Referring to FIG. 8, the soft electromagnetic actuator assembly 100 may be configured by connecting a plurality of unit actuators 101, 102, and 103 to each other through permanent magnet portions 110 and 130. That is, the soft electromagnetic actuator assembly 100 may be configured by attaching the second permanent magnet portion 130 of the first unit actuator 101 and the first permanent magnet portion 110 of the second unit actuator 102 to each other and attaching the second permanent magnet portion 130 of the second unit actuator 102 and the first permanent magnet portion 110 of the third unit actuator 103 to each other.

The unit actuators 101, 102, and 103 may be configured to have the same structure and effect as those of the soft electromagnetic actuator 10 described above with reference to FIGS. 1 to 7.

Figure 9:
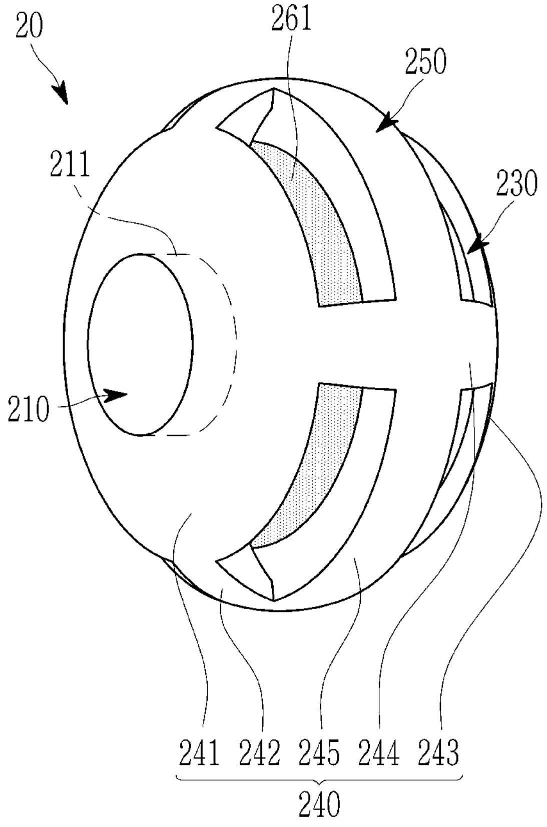
FIG. 9 is a perspective view illustrating a soft electromagnetic actuator according to another exemplary embodiment.
Figure 10:
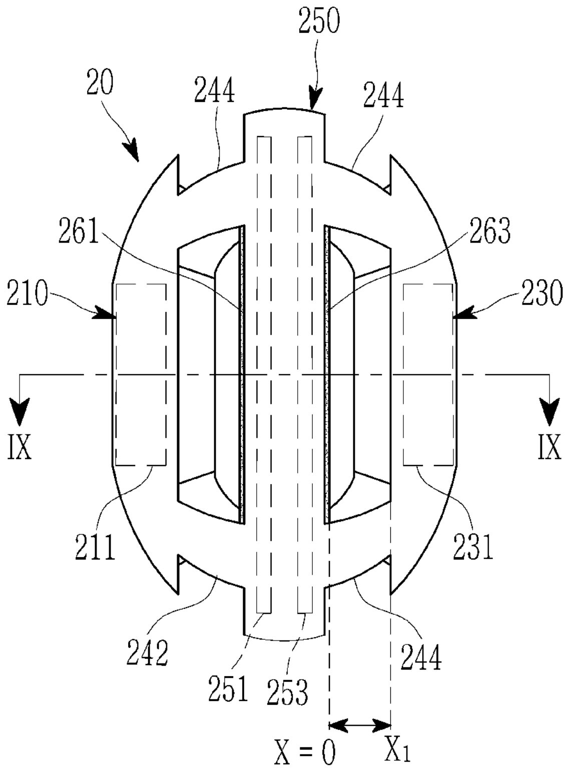
FIG. 10 is a front view of the soft electromagnetic actuator shown in FIG. 9.
Figure 11:
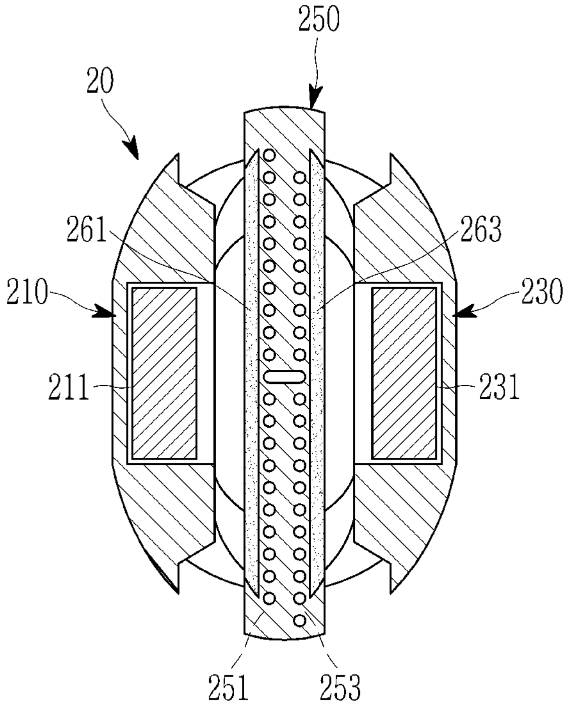
FIG. 11 is a cross-sectional view taken along line IX-IX of FIG. 10.

FIG. 9 is a perspective view showing a soft electromagnetic actuator according to another exemplary embodiment, FIG. 10 is a front view of the soft electromagnetic actuator shown in FIG. 9, and FIG. 11 is a cross-sectional view taken along line IX-IX of FIG. 10.

Referring to FIG. 9, a soft electromagnetic actuator 20 according to the present exemplary embodiment includes a housing 240, a stretchable coil portion 250 disposed at the center of the housing 240, and a third permanent magnet portion 210 and a fourth permanent magnet portion 230 disposed on both sides of the stretchable coil portion 250, while maintaining a distance. The stretchable coil portion 250 generates an electromagnetic field as power is applied and may form magnetic poles on both sides.

The housing 240 has frame portions 242 and 244 formed of a stretchable elastic body and surrounds the stretchable coil portion 250 and the third and fourth permanent magnet portions 210 and 230, and may function to set positions of each component. The stretchable coil portion 250 has a first surface and a second surface facing in mutually opposite directions, the third permanent magnet portion 210 is located to face the first surface of the stretchable coil portion 250 and the fourth permanent magnet portion 230 may be located to face the second surface of the stretchable coil portion 250.

The third permanent magnet portion 210 may be connected, while maintaining an interval from the stretchable coil portion 250 by the third frame portion 242, and the fourth permanent magnet portion 230 may be connected, while maintaining an interval from the stretchable coil portion 250 by the fourth frame portion 244. The third frame portion 242 may include a plurality of frames, and the plurality of frames may be spaced apart from each other along the circumference of the stretchable coil portion 250 and connected to the third permanent magnet portion 210. In addition, the fourth frame portion 244 may also include a plurality of frames, the plurality of frames may be spaced apart from each other along the circumference of the stretchable coil portion 250 and connected to the fourth permanent magnet portion 230.

In the present exemplary embodiment, the third permanent magnet portion 210 and the fourth permanent magnet portion 230 may be arranged so that the same magnetic poles face each other. That is, when the S pole in the third permanent magnet portion 210 faces the first surface of the stretchable coil portion 250 and the N pole is located on the opposite side, the S pole in the fourth permanent magnet portion 230 may face the second surface of the stretchable coil portion 250 and the N pole may be located on the opposite side. In addition, when the N pole in the third permanent magnet portion 210 faces the first surface of the stretchable coil portion 250 and the S pole is located on the opposite side, the N pole in the fourth permanent magnet portion 230 may also face the second surface of the stretchable coil portion 250 and the S pole may be located on the opposite side.

In addition, ferromagnetic layers 261 and 263 may be formed on both sides of the stretchable coil portion 250. The ferromagnetic layers 261 and 263 include a first ferromagnetic layer 261 disposed in contact with the first surface in which the stretchable coil portion 250 faces the third permanent magnet portion 210 and a second ferromagnetic layer 263 disposed in contact with the second surface in which the stretchable coil portion 250 faces the fourth permanent magnet portion 230. Therefore, when power is applied to the stretchable coil portion 250 to form an electromagnetic force, when attraction acts with the third permanent magnet portion 210, the first ferromagnetic layer 261 is attached to the third permanent magnet portion 210, and when an attraction acts with the fourth permanent magnet portion 230, the second ferromagnetic layer 263 may be attached to the fourth permanent magnet portion 230. Thus, the third permanent magnet portion 210 or the fourth permanent magnet portion 230 attached to the ferromagnetic layer 261 and 263 may maintain the attached state even when the power is cut off from the stretchable coil portion 250, when an electromagnetic force is formed by applying another power to the stretchable coil portion 250 and a repulsion acts with the third permanent magnet portion 210 or the fourth permanent magnet portion 230, the third permanent magnet portion 210 or the fourth permanent magnet portion 230 may be separated from the ferromagnetic layers 261 and 263.

Therefore, the soft electromagnetic actuator 20 according to the present exemplary embodiment may have a third region in which the attraction acting between the third permanent magnet portion 210 and the first ferromagnetic layer 261 or between the fourth permanent magnet portion 230 and the second ferromagnetic layer 263 is greater than a resultant force of the repulsion between the third permanent magnet portion 210 and the fourth permanent magnet portion 230 and the elastic force of the frame portions 242 and 244 at a point closer to the stretchable coil portion 250 based on the distance in an expanded state between the third permanent magnet portion 210 or the fourth permanent magnet portion 230 and the stretchable coil portion 250. In addition, the soft electromagnetic actuator 20 according to the present exemplary embodiment may have a fourth region in which the resultant force of the repulsion between the third permanent magnet portion 210 and the fourth permanent magnet portion 230 and the elastic force of the frame portions 242 and 244 is greater than the attraction acting between the third permanent magnet portion 210 and the first ferromagnetic layer 261 or between the fourth permanent magnet portion 230 an the second ferromagnetic layer 263 at a point closer to the third permanent magnet portion 210 or the fourth permanent magnet portion 230 than the stretchable coil portion 250 based on the distance between the third permanent magnet portion 210 or the fourth permanent magnet portion 230 and the stretchable coil portion 250.

Therefore, when the soft electromagnetic actuator 20 is in the expanded state and asymmetrically contracted by applying a current, that is, when one side contracts and the other side expands, the attraction therebetween increases to be greater than the resultant force of the elastic force of the frame portions 242 and 244 and the repulsion between the permanent magnet portions 210 and 230 as the distance between the third permanent magnet portion 210 and the first ferromagnetic layer 261 or between the fourth permanent magnet portion 230 and the second ferromagnetic layer 263 decreases. Accordingly, even if power is applied to and then removed from the stretchable coil portion 250, the third permanent magnet portion 210 or the fourth permanent magnet portion 230 may be attached as it is and maintained in an asymmetric contracted state, rather than being returned to the original position, by the elastic force of the frame portions 242 and 244, thereby exhibiting bi-stability FIG. 12 is a diagram illustrating a state of an actuator driven by applying a current to the soft electromagnetic actuator shown in FIG. 9.

Figure 12:
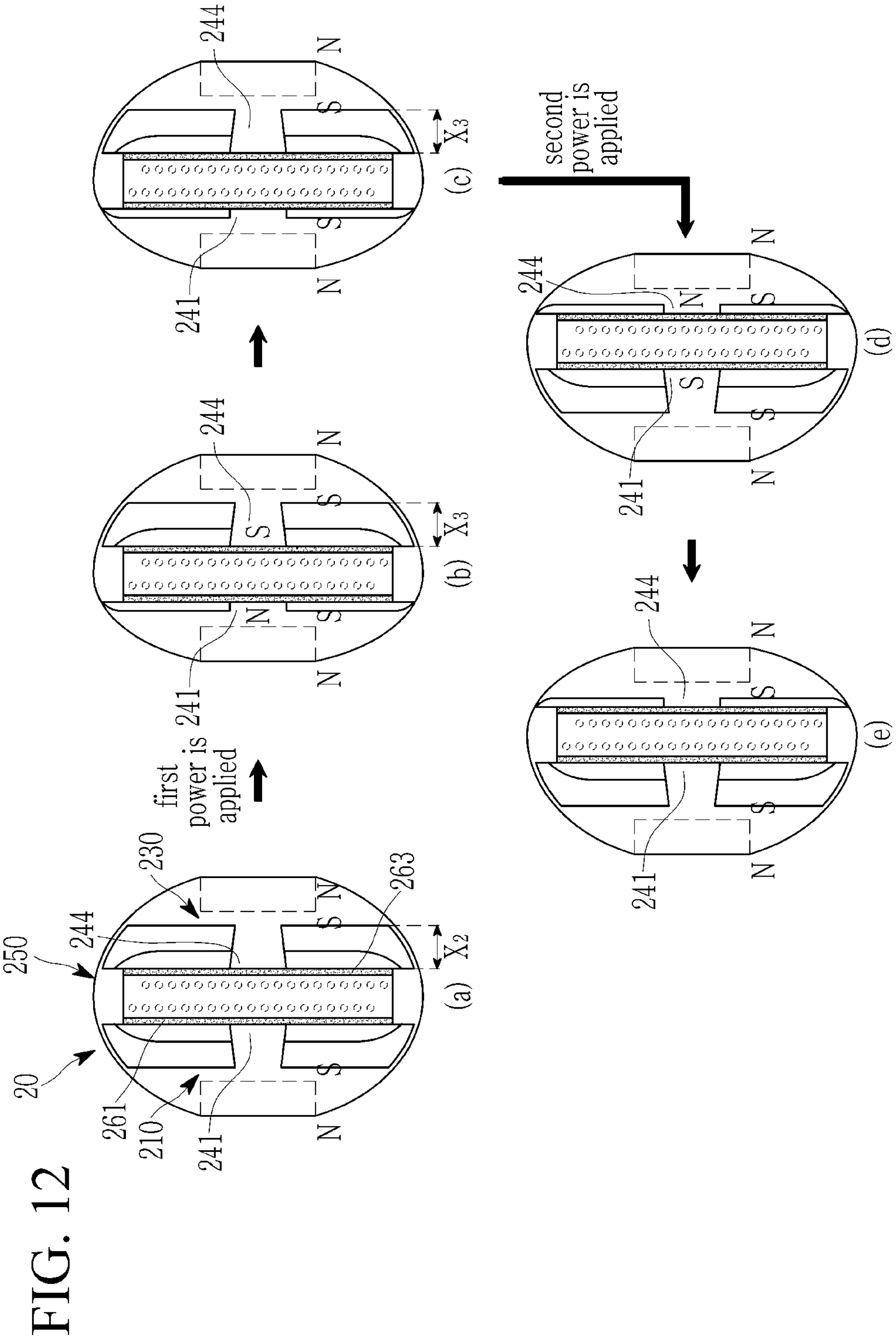
FIG. 12 is a diagram illustrating a state of an actuator driven by applying a current to the soft electromagnetic actuator shown in FIG. 9.

In a soft electromagnetic actuator 20 according to the present exemplary embodiment, a maximum distance $x_2$ of the stretchable coil portion 250 and the third and fourth permanent magnet portions 210 and 230 is symmetrically maintained at an initial stage (refer to (a) of FIG. 12). When the stretchable coil portion 250 has a symmetrical structure in which no current is applied, attraction between the ferromagnetic layers 261 and 263 and the permanent magnet portions 210 and 230 is not greater than the sum of the elastic force of the frame portions 242 and 244 and repulsions between the third and fourth permanent magnet portions 210 and 230. At this time, the maximum distance $x_2$ is designed as an initial length ($x_1$, refer to FIG. 10) before deformation of the frame portions 242 and 244 of the housing 240, but when the soft electromagnetic actuator 20 is manufactured, the elastic force of the frame portions 242 and 244, the attraction between the ferromagnetic layers 261 and 263 and the permanent magnet portions 210 and 230, and the repulsion between the third and fourth permanent magnet portions 210 and 230 are balanced, and the distance $x_2$ may be maintained as a value slightly greater than $x_1$.

Next, referring to (b) of FIG. 12, by applying the first power to the stretchable coil portion 250, an electromagnetic field may be formed so that attraction acts between the stretchable coil portion 250 and the third and fourth permanent magnet portions 230. That is, a polarity opposite to a polarity of the third permanent magnet portion 210 facing the stretchable coil portion 250 may be generated on the first surface of the stretchable coil portion 250, and a polarity the same as a polarity of the fourth permanent magnet portion 230 facing the stretchable coil portion 250 may be generated on the second surface of the stretchable coil portion 250. For example, as shown in (b) of FIG. 12, the polarities of the electrodes may be set such that a magnetic pole arrangement of the stretchable coil portion 250 is S-N when a magnetic pole arrangement of the third permanent magnet portion 210 is N-S and a magnetic pole arrangement of the fourth permanent magnet portion 230 is S-N, and the first power may be applied. In this manner, the stretchable coil portion 250 and the third permanent magnet portion 210, between which attraction acts, may be attached to each other, and the stretchable coil portion 250 and the fourth permanent magnet portion 230, between which the repulsion acts, may be separated from each other. Therefore, when the electromagnetic field is formed in the stretchable coil portion 250, the structure of the soft electromagnetic actuator 20 is asymmetrically deformed, the third permanent magnet portion 210 is attached to the first ferromagnetic layer 261, and the fourth permanent magnet portion 230 maintains a distance of $x_3$ that is distant than $x_2$ from the second ferromagnetic layer 263.

Next, when the power is removed from the stretchable coil portion 250, the electromagnetic field of the stretchable coil portion 250 disappears. However, since the surfaces of the third permanent magnet portion 210 and the fourth permanent magnet portion 230 having the same polarities face each other, repulsion may act therebetween.

Since the ferromagnetic layers 261 and 263 are disposed on both sides of the stretchable coil portion 250, even if the stretchable coil portion 250 loses the electromagnetic force, attraction may act between the third permanent magnet portion 210 and the first ferromagnetic layer 261 so that the third permanent magnet portion 210 and the stretchable coil portion 250 may maintain an attached state to each other (refer to (c) of FIG. 12). That is, even when the applied current is turned off, the attraction between the first ferromagnetic layer 261 and the third permanent magnet 210 is greater than the sum of the repulsion between the third permanent magnet 210 and the fourth permanent magnet 230 and the elastic force of the third frame portion 242, and in this case, a distance between the second ferromagnetic layer 263 and the fourth permanent magnet portion 230 may be $x_3$.

Next, by applying a second power to the stretchable coil portion 250, an electromagnetic field may be formed so that repulsion acts between the stretchable coil portion 250 and the third permanent magnet portion 210 and attraction acts between the stretchable coil portion 250 and the fourth permanent magnet portion 230. The second power may be set such that the polarities of the applied electrodes are opposite to those of the first power. A polarity that is the same as a polarity of the side of the third permanent magnet portion 210 facing the stretchable coil portion 250 is generated on one opposite surface of the stretchable coil portion 250, and a polarity that is opposite to a polarity of the side of the fourth permanent magnetic portion 230 facing the stretchable coil portion 250 may be generated on the other opposite surface of the stretchable coil portion 250. As an example, as shown in (d) of FIG. 12, the polarities of the electrodes may be set such that a magnetic pole arrangement of the stretchable coil portion 250 is S-N when a magnetic pole arrangement of the third permanent magnet portion 210 is N-S and a magnetic pole arrangement of the fourth permanent magnet portion 230 is S-N, and the second power may be applied. In this manner, the stretchable coil portion 250 and the third permanent magnet portion 210, between which the repulsion acts, are separated from each other, and the stretchable coil portion 250 and the fourth permanent magnet portion 230, between which the attraction acts, may be attached to each other (refer to (d) of FIG. 12).

Finally, when the power is removed from the stretchable coil portion 250, the electromagnetic field of the stretchable coil portion 250 disappears. However, since the sides of the third permanent magnet portion 210 and the fourth permanent magnet portion 230 having the same polarities face each other, repulsion may act therebetween. Since the ferromagnetic layers 261 and 263 are disposed on both sides of the stretchable coil portion 250, even if the stretchable coil portion 250 loses the electromagnetic force, attraction acts between the fourth permanent magnet portion 230 and the second ferromagnetic layer 263, so that the fourth permanent magnet portion 230 and the stretchable coil portion 250 may be maintained at an attached state (refer to (e) of FIG. 12).

Figure 13:
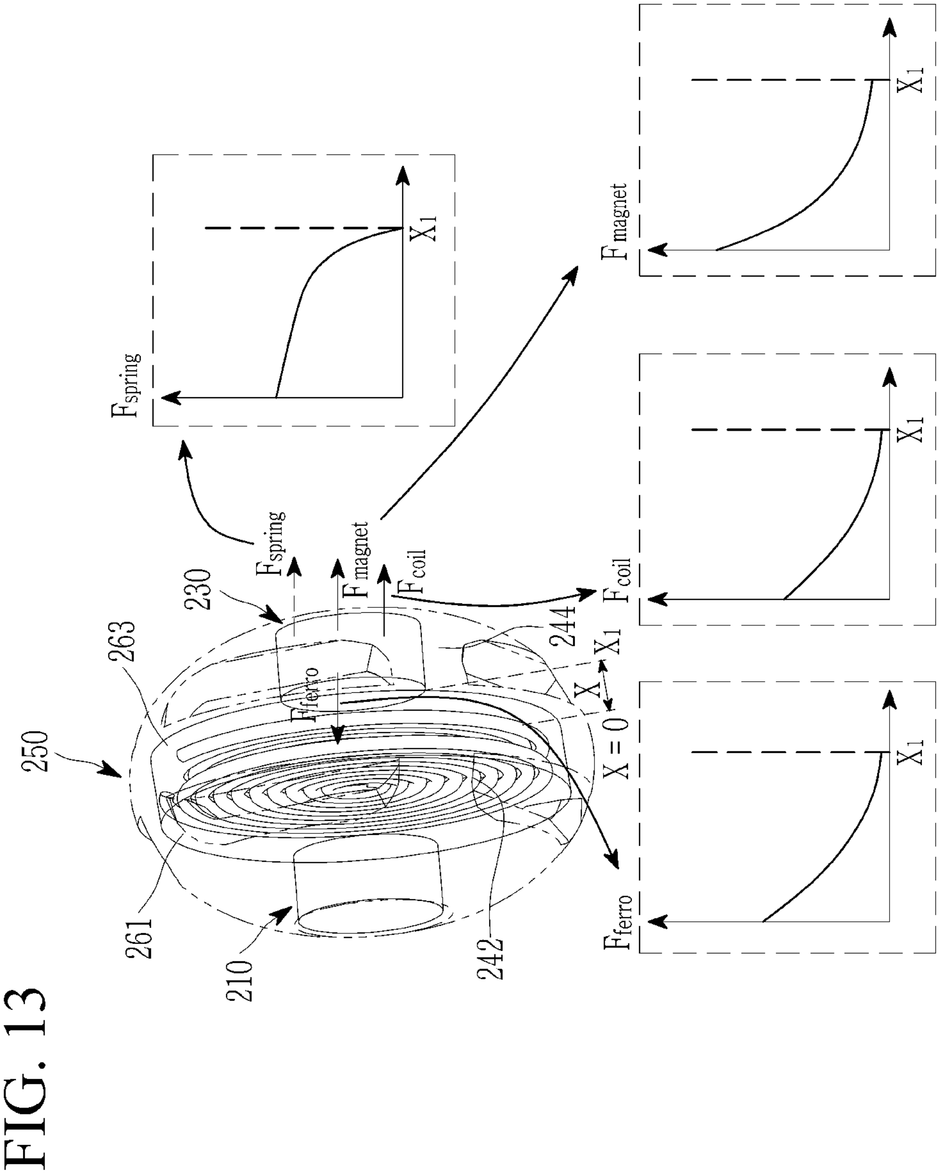
FIG. 13 is a diagram illustrating a bi-stable condition of the soft electromagnetic actuator shown in FIG. 9.
Figure 14:
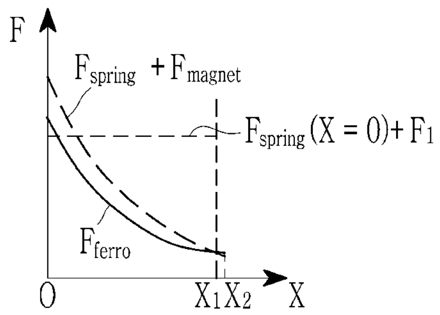
FIG. 14 is a graph illustrating a force relationship according to a distance between components of the soft electromagnetic actuator shown in FIG. 9.

FIG. 13 is a diagram illustrating a bi-stable condition of the soft electromagnetic actuator shown in FIG. 9, and FIG. 14 is a graph illustrating a force relationship according to a distance between components of the soft electromagnetic actuator shown in FIG. 9.

In the soft electromagnetic actuator 20 according to the present exemplary embodiment, the electromagnetic force of the stretchable coil portion 250, the magnetic force of the third and fourth permanent magnet portions 210 and 230, the elastic force of the third and fourth frame portions 242 and 244, and the first and second ferromagnetic layers 261 and 263 may be designed to form a bi-stable, bidirectional condition.

Referring to FIG. 13, the attraction between the stretchable coil portion 250 and the fourth permanent magnet portion 230 (or the third permanent magnet portion 210) may be defined as $F_{coil}$, the repulsion between the third permanent magnet portion 210 and the fourth permanent magnet portion may be defined as $F_{magnet}$, the elastic force of the fourth frame portion 244 (or the third frame portion 242) may be defined as $F_{spring}$, and the attraction between the second ferromagnetic layer 263 and the fourth permanent magnet portion 230 (or the attraction between the first ferromagnetic layer 261 and the third permanent magnet 210) may be defined as $F_{ferro}$. When the distance from the fourth permanent magnet portion 230 to the stretchable coil portion 250 is x, when power is applied to the stretchable coil portion 250 and attraction and repulsion act, each of $F_{coil}$, $F_{magnet}$, $F_{spring}$, and $F_{ferro}$ decreases in a direction toward the fourth permanent magnet portion 230 from the stretchable coil portion 250. That is, at x=0, $F_{coil}$, $F_{magnet}$, and $F_{ferro}$ have maximum values, and at $x=x_1$, $F_{coil}$, $F_{magnet}$, $F_{spring}$, and $F_{ferro}$ have minimum values and $F_{spring}$ is 0. However, in a direction toward $x_1$, a change rate of $F_{coil}$, $F_{magnet}$, and $F_{ferro}$ gradually decreases, and in a direction toward $x_1$, a change rate of force of $F_{spring}$ gradually increases.

Referring to FIG. 14, when the stretchable coil portion 250 has a symmetrical structure in which no current is applied, $F_{ferro}$ is smaller than $F_{spring}+F_{magnet}$, so both permanent magnet portions 210 and 230 are not attached to the ferromagnetic layers 261 and 263, and the symmetric structure (refer to (a) of FIG. 12) is maintained at $x_2$, which is a slightly greater than the distance $x_1$, an intersection of the two graphs.

When electromagnetic force is applied to the stretchable coil portion 250, the stretchable coil portion 250 is deformed to have an asymmetric structure, and in order for one permanent magnet portion 210 to be attached to the ferromagnetic layer 261 even when the current is cut off, the attraction acting between and the ferromagnetic layer 261 and the permanent magnet 210 at x=0 should be greater than the sum ($F_{spring\ (x=0)}$ F1) of the elastic force of the frame portions 241 and 244 and the repulsion between the both permanent magnet portions 210 and 230. Here, $F_1$ may be defined as repulsion between both permanent magnet portions 210 and 230 at the position $x_2$. The position $x_2$ in the symmetric structure may be obtained through an intersection in the distance-force graph, but it is difficult to obtain $x_3$ in an asymmetric structure, and thus, it is assumed that the permanent magnet portions 210 and 230 moved to $x_3$ are at $x_2$, and a value of the repulsion between both permanent magnet portions 210 and 230 is $F_1$. Since $x_3$ is farther than $x_2$, the actual repulsion value between both permanent magnet portions 210 and 230 in the asymmetrical structure is smaller than $F_1$. In the graph shown in FIG. 14, when x=0, attraction acting between the ferromagnetic layer 261 and the permanent magnet portion 210 is greater than $F_{spring\ (x=0)}+F_1$, and therefore, it may be guaranteed that the attraction acting between the ferromagnetic layer 261 and the permanent magnet portion 210 is greater than the elastic force of the frame portions 241 and 244 and the repulsion between the actual both permanent magnet portions 210 and 230.

Although the exemplary embodiment of the present invention has been described above, the present invention is not limited thereto, and it is possible to carry out various modifications within the claim coverage, the description of the invention, and the accompanying drawings, and such modifications also fall within the scope of the present invention.

DESCRIPTION OF SYMBOLS

- 10, 20: soft electromagnetic actuator
- 100: soft electromagnetic actuator assembly
- 110, 130: first permanent magnet portion, second permanent magnet portion
- 140, 240: housing
- 142, 144: first frame portion, second frame portion
- 150, 250: stretchable coil portion
- 210, 230: third permanent magnet portion, fourth permanent magnet portion
- 242, 244: third frame portion, fourth frame portion
- 261, 263: first ferromagnetic layer, second ferromagnetic layer

What is claimed is:

1. A bi-stable soft electromagnetic actuator comprising:

a housing including a frame portion formed of a stretchable elastic body;

a stretchable coil portion generating an electromagnetic field by applied power, located in the housing, and having a first surface and a second surface facing in mutually opposite directions; and at least one pair of permanent magnet portions arranged to face each other with the stretchable portions respectively facing the first surface and the second surface of the stretchable coil portion and arranged to maintain a distance from the stretchable coil portion by the frame portion.

2. The bi-stable soft electromagnetic actuator of claim 1, wherein:

the housing includes a coil portion cover, the stretchable coil portion is configured to include a pair of stretchable coils sharing a central axis and connected to each other in a facing manner in the coil portion cover.

3. The bi-stable soft electromagnetic actuator of claim 1, wherein:

the housing includes a magnet portion cover located to face each of the first surface and the second surface of the stretchable coil portion, and the at least one pair of permanent magnet portions are each configured to include a permanent magnet in the magnet portion cover.

4. The bi-stable soft electromagnetic actuator of claim 1, wherein:

the frame portion includes a plurality of frames spaced apart from each other along a circumference of the stretchable coil portion.

5. The bi-stable soft electromagnetic actuator of claim 1, wherein:

the housing includes a silicone elastomer material.

6. The bi-stable soft electromagnetic actuator of claim 1, wherein:

the at least one pair of permanent magnet portions includes a first permanent magnet portion and a second permanent magnet portion arranged to face each other with the stretchable coil portion interposed therebetween, and the first permanent magnet portion and the second permanent magnet portion are arranged so that different polarities face each other so that attractions act therebetween.

7. The bi-stable soft electromagnetic actuator of claim 6, wherein:

the housing includes a first frame portion including a plurality of frames connecting the first permanent magnet portion and the stretchable coil portion to each other; and a second frame portion including a plurality of frames connecting the second permanent magnet portion and the stretchable coil portion to each other.

8. The bi-stable soft electromagnetic actuator of claim 7, wherein:

the housing includes a first magnet portion cover constituting the first permanent magnet portion, a second magnet portion cover constituting the second permanent magnet portion, and a coil portion cover constituting the stretchable coil portion, the first frame portion is configured to connect the first magnet portion cover and the coil portion cover to each other, and the second frame portion is configured to connect the second magnet portion cover and the coil portion cover to each other.

9. The bi-stable soft electromagnetic actuator of claim 6, wherein:

the bi-stable soft electromagnetic actuator has a first region in which an attraction acting between the first permanent magnet portion and the second permanent magnet portion is greater than an elastic force of the frame portion at a point closer to the stretchable coil portion than the first permanent magnet portion or the second permanent magnet portion based on a distance between the first permanent magnet portion or the second permanent magnet portion and the stretchable coil portion, and a second region in which an elastic force of the frame portion is greater than an attraction acting between the first permanent magnet portion and the second permanent magnet portion at a point closer to the first permanent magnet portion or the second permanent magnet portion than the stretchable coil portion based on the distance between the first permanent magnet portion or the second permanent magnet portion and the stretchable coil portion.

10. The bi-stable soft electromagnetic actuator of claim 1, wherein:

the at least one pair of permanent magnet portions includes a third permanent magnet and a fourth permanent magnet arranged to face each other with the stretchable coil interposed therebetween, and the third permanent magnet portion and the fourth permanent magnet portion are arranged so that the same polarities face each other so that a repulsion acts therebetween.

11. The bi-stable soft electromagnetic actuator of claim 10, wherein:

the housing includes a third frame portion including a plurality of frames connecting the third permanent magnet portion and the stretchable coil portion to each other; and a fourth frame portion including a plurality of frames connecting the fourth permanent magnet portion and the stretchable coil portion to each other.

12. The bi-stable soft electromagnetic actuator of claim 11, wherein:

the housing includes a third magnet portion cover constituting the third permanent magnet portion, a fourth magnet portion cover constituting the fourth permanent magnet portion, and a coil portion cover constituting the stretchable coil portion, the third frame portion is configured to connect the third magnet portion cover and the coil portion cover to each other, and the fourth frame portion is configured to connect the fourth magnet portion cover and the coil portion cover to each other.

13. The bi-stable soft electromagnetic actuator of claim 10, wherein:

a first ferromagnetic layer and a second ferromagnetic layer are formed to be adjacent to each of the first and second surfaces of the stretchable coil portion.

14. The bi-stable soft electromagnetic actuator of claim 13, wherein:

the bi-stable soft electromagnetic actuator has a third region in which an attraction acting between the third permanent magnet portion and the first ferromagnetic layer or between the fourth permanent magnet portion and the second ferromagnetic layer is greater than a resultant force of a repulsion between the third permanent magnet portion and the fourth permanent magnet portion and an elastic force of the frame portion at a point closer to the stretchable coil portion than the third permanent magnet portion or the fourth permanent magnet portion based on a distance between the third permanent magnet portion or the fourth permanent magnet portion and the stretchable coil portion, and a fourth region in which a resultant force of the repulsion between the third permanent magnet portion and the fourth permanent magnet portion and the elastic force of the frame portion is greater than the attraction acting between the third permanent magnet portion and the first ferromagnetic layer or between the fourth permanent magnet portion and the second ferromagnetic layer at a point closer to the third permanent magnet portion or the fourth permanent magnet portion than the stretchable coil portion based on the distance between the third permanent magnet portion or the fourth permanent magnet portion and the stretchable coil portion.

15. A bi-stable soft electromagnetic actuator assembly comprising:

a plurality of unit actuators attached to each other by magnetic force, each of the plurality of unit actuators includes:

a housing including a frame portion formed of a stretchable elastic body;

a stretchable coil portion generating an electromagnetic field by applied power, located in the housing, and having a first surface and a second surface facing in mutually opposite directions; and at least one pair of permanent magnet portions respectively facing the first surface and the second surface of the stretchable coil portion and arranged to maintain a distance by the frame portion.

16. The bi-stable soft electromagnetic actuator assembly of claim 15, wherein:

the at least one pair of permanent magnet portions includes a first permanent magnet portion and a second permanent magnet portion arranged to face each other with the stretchable coil portion interposed therebetween, and, the first permanent magnet portion and the second permanent magnet portion are arranged so that different polarities face each other so that an attraction acts therebetween.

17. The bi-stable soft electromagnetic actuator assembly of claim 16, wherein:

the plurality of unit actuators are configured such that the first permanent magnet portion and the second permanent magnet portion of different unit actuators are attached and coupled to each other.

18. The bi-stable soft electromagnetic actuator assembly of claim 16, wherein:

the housing includes:

a first frame portion including a plurality of frames connecting the first permanent magnet portion and the stretchable coil portion to each other; and a second frame portion including a plurality of frames connecting the second permanent magnet portion and the stretchable coil portion to each other.

19. The bi-stable soft electromagnetic actuator assembly of claim 16, wherein:

the unit actuator has a first region in which an attraction acting between the first permanent magnet portion and the second permanent magnet portion is greater than an elastic force of the frame portion at a point closer to the stretchable coil portion than the first permanent magnet portion or the second permanent magnet portion based on a distance between the first permanent magnet portion or the second permanent magnet portion and the stretchable coil portion, and a second region in which an elastic force of the frame portion is greater than an attraction acting between the first permanent magnet portion and the second permanent magnet portion at a point closer to the first permanent magnet portion or the second permanent magnet portion than the stretchable coil portion based on the distance between the first permanent magnet portion or the second permanent magnet portion and the stretchable coil portion.

20. The bi-stable soft electromagnetic actuator assembly of claim 15, wherein:

the housing includes a silicone elastomer material.

* * * * *